United States Patent
Sugiyama

(10) Patent No.: US 6,824,286 B2
(45) Date of Patent: Nov. 30, 2004

(54) SURFACE LIGHT SOURCE

(75) Inventor: Ken Sugiyama, Saitama-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/352,130

(22) Filed: Jan. 28, 2003

(65) Prior Publication Data

US 2003/0142507 A1 Jul. 31, 2003

(30) Foreign Application Priority Data

Jan. 28, 2002 (JP) ........................................ 2002-019204

(51) Int. Cl.[7] .................................................. F21V 8/00
(52) U.S. Cl. .......................................... 362/31; 362/26
(58) Field of Search ................................ 362/555, 558, 362/561; 349/65; 40/546

(56) References Cited

U.S. PATENT DOCUMENTS

| 5,664,862 A | * | 9/1997 | Redmond et al. .............. 362/31 |
| 5,668,913 A | * | 9/1997 | Tai et al. ....................... 362/31 |
| 6,481,130 B1 | * | 11/2002 | Wu .............................. 40/546 |

* cited by examiner

*Primary Examiner*—Y My Quach Lee
(74) *Attorney, Agent, or Firm*—Oblon, Spivak, McClelland, Maier & Neustadt, P.C.

(57) ABSTRACT

A surface light source includes concave lens portions provided opposite to light-emitting diodes. The concave lens portions refract or align point light from the diodes. The refracted light is transformed into linear light by a light guide pipe. The linear light is further transformed into surface light by a light guide plate. Due to refraction or alignment of the concave lens portions, the point light from the diodes is efficiently transformed into the linear light. Thus, the surface light source is capable of improving the brightness of surface light transformed by the light guide plate.

5 Claims, 7 Drawing Sheets

SURFACE LIGHT SOURCE

FIELD OF THE INVENTION

This invention generally relates to a surface light source and, in particular, to a surface light source which is capable of transforming light from a point light source to a substantially surface light source.

BACKGROUND OF THE INVENTION

The structure of a prior art surface light source is shown in FIGS. 10 through 12. Such a surface light source has been used for a front or rear light source 1 of a liquid crystal display device. The light source 1 includes a pair of light-emitting diodes 2 that emit point-like light, or substantially point light (collectively called "point light") L1. The light-emitting diodes 2 are connected to a flexible printed circuit board 3 through which electric energy is supplied to the diodes 2.

Since the diodes 2 emit point light L1, a light guide pipe 4 is provided to transform such point light L1 into line-like light or substantially linear light (collectively called "linear light") L2. The light guide pipe 4 is made of a resin molded column member and is rectangular in cross section. The diodes 2 are provided at both ends of the longitudinal axis of the light guide pipe 4 and face each other as shown in FIG. 10.

The light guide pipe 4 has a plurality of prisms 5 on one side along its longitudinal direction to transform point light L1 into linear light L2. A light guide plate 6 is provided on the other side opposite to the prisms 5 of the light guide pipe 4. The light guide plate 6 is optically coupled to the light guide pipe 4 at the sides where the plate 6 and pipe 4 face each other. The light guide plate 6 further transforms the linear light L2 from the light guide pipe 4 into surface-like light or substantially surface light (collectively call "surface light") L3. Thus, as shown in FIG. 12, the upper (front) surface of the light guide plate 6 is provided with special prisms 7 while the back surface has a reflection film not shown but made by coating or by applying an evaporation (vapor deposition) process.

Each longitudinal side surface of the light guide pipe 4 except that with the prisms 5 is covered by a high reflective metal plate reflector 8 as shown in FIGS. 10 and 11. This reflector 8 reflects incident light, with high reflection, to the inside of the light guide pipe 4. Such incident light is derived from reflection and diffusion of the light L1 from the diodes 2 to other directions than that to the light guide plate 6.

The incident light L1 from the diodes 2 to the light guide pipe 4 is transformed into linear light L2 directed to the light guide plate 6 by the prisms 5 of the light guide pipe 4 as shown in FIG. 11 because the prisms 5 are wedge-like in shape and are formed on the side of the light guide pipe 4 opposite to the one facing the light guide plate 6.

As shown in FIG. 12 by dotted lines and an arrow, the linear light L2 propagating from the light guide pipe 4 to the inside of the light guide plate 6 is incident on the prisms 7 formed on the upper surface of the light guide plate 6 and is transformed into surface light L3. The surface light L3 is projected onto a reflection or transparent type liquid crystal display panel not shown but provided underneath the light guide plate 6 by the prisms 7.

The light L3 projected onto the reflection type liquid crystal display panel, on one hand, is reflected back by a reflecting electrode not shown but provided therein, passes through the inside of the light guide plate 6 and comes to the eyes of an operator. The light L3 projected onto the transparent type liquid crystal display panel, on the other hand, is made use of as transparent light from the surface opposite to the one provided with the prisms 7. The point light L1 from the diodes 2 is transformed into linear light L2. Such linear light L2 is eventually transformed into substantially surface light L3 so that it is visible to, and is recognized by, an operator as entirely uniform brightness light for a liquid crystal display panel.

In summary, where the diodes 2 are used as point light sources, the light L1 emitted from the diodes 2 is transformed into linear light L2 by the light guide pipe 4 and the linear light L2 is further transformed into surface light L3 by the light guide plate 6. Since a liquid crystal display panel incorporated into the surface light source absorbs or scatters the surface light L3, an operator recognizes it.

The surface light $L_3$ visible to the eyes of an operator is subject to a series of the light transforming processes so that it loses mostly its electric energy supplied from the flexible printed circuit board 3 to the diodes 2. Thus, the prior art surface light source is low in brightness so that it is not satisfactory to customers.

Further, since the diodes 2 are not concentrically disposed with respect to the display area, it is known that the display area in the center of the liquid crystal display panel becomes lower in brightness as a place of the display area is farther in distance from the diodes 2. Such a difference in brightness depending on a place of the display area is recognized by an operator as uneven brightness and the surface light source significantly loses its product value.

There have been various methods to improve the uneven brightness. The configurations of the prisms 7 formed on the upper surface of the light guide plate 6 are varied gradually as the prisms 7 become farther in distance from the light guide pipe 4 thereby to make a quantity of light uniformly supplied to the entire surface of the refection type liquid crystal display panel, i.e., a uniform brightness distribution of the display area.

In short, the point light L1 from the diodes 2 is greater in quantity at a closer place to the diodes 2 but is less at a farther place from them. This causes uneven brightness distribution of the light on the display panel. Thus, the prisms 7 of the light guide plate 6 have specific configurations, respectively, in accordance with the distance from the light guide pipe 4 as set forth above. Alternatively, incident light quantity from the light guide pipe 4 to each of the prisms 7 of the light guide plate 6 is adjusted to reduce difference in brightness of the display area.

However, those methods have not always brought about uniform brightness distribution on the display panel. In addition, the light guide plate 6 cannot increase its brightness unless the light guide pipe 4 is improved to supply a sufficient quantity of light to the light guide plate 6.

The present invention is to provide a surface light source with substantially improved uniform brightness.

Briefly, a surface light source of the invention includes a light source to emit point light, a first light transforming member to transform the point light into linear light and a second light transforming member to transform the linear light into surface light. The first light transforming member includes a concave portion or lens to receive the point light from the light source and to distribute the same to the first light transforming member. Since the point light is distributed by the concave lens of the first light transforming member, it is efficiently transformed to the surface light by the second light transforming member so that the surface light is improved to be substantially uniform in brightness.

DETAILED EXPLANATION OF THE INVENTION

Figure 1:
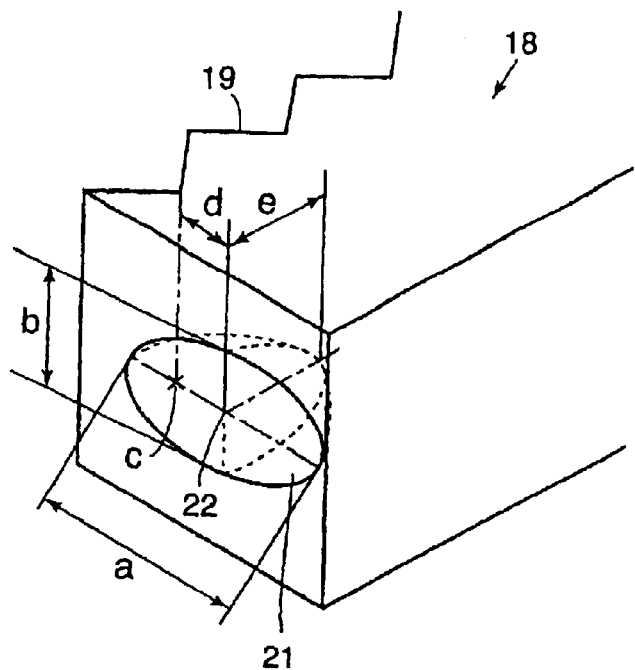
FIG. 1 is a partial perspective view of a light guide pipe in a surface light source in accordance with the present invention.
Figure 3:
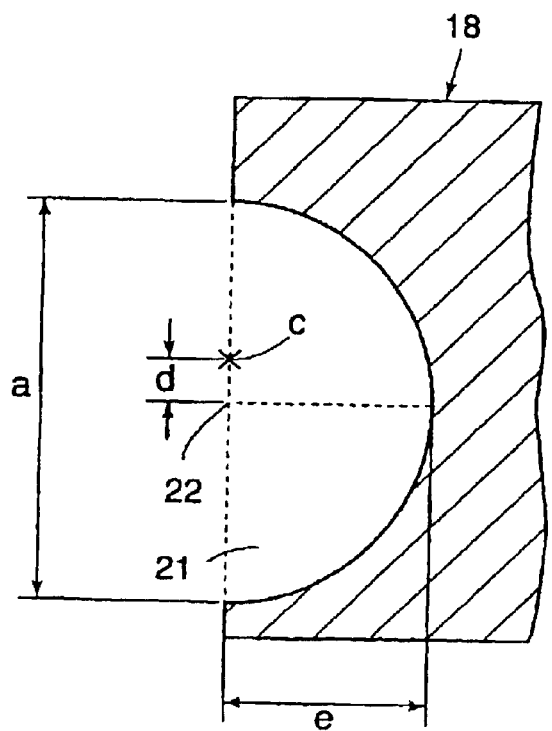
FIG. 3 is a sectional view of a concave lens of a light guide pipe cut along line III-III' shown in FIG. 4.

With reference to FIGS. 1–7, a surface light source for a liquid crystal display device will be explained below as an embodiment of the present invention.

The liquid crystal display device 11 is equipped with a reflection type liquid crystal display panel 12 used for mobile phones or the like. This liquid crystal display panel 12 is integrated with thin film transistors formed between two 5 cm×5 cm square glass substrates, and a polarizer 13 on the surface of the glass substrate.

In addition, the liquid crystal display panel 12 is connected to a flexible printed circuit board 14 so that the display panel 12 is supplied with electric energy and signals and displays images on the display portion.

On the surface of the liquid crystal display panel 12 is provided a surface light source 15 to project surface light L3 onto the panel 12 as an auxiliary light source. The surface light source 15 is coupled to a pair of light-emitting diodes 16 generating white point light as point light sources. The diodes 16 are also connected to a flexible printed circuit board 17 to receive electric energy.

The diodes 16 are disposed at both ends of a light guide pipe 18 to transform the point light into linear light L2. This light guide pipe 18 is made of a resin molded and is rectangular parallelepiped in shape. The diodes 16 project point light into the inside of the light guide pipe 18.

Figure 7:
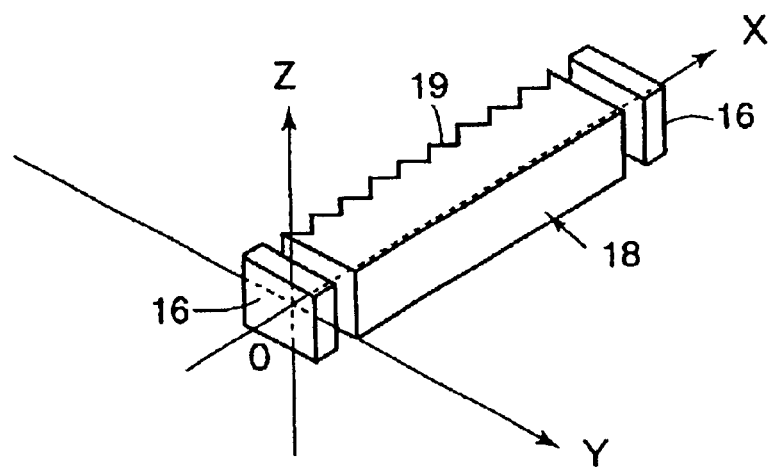
FIG. 7 shows X, Y and Z coordinate axes defining one of the point light sources as the origin of the axes in the surface light source shown in FIG. 1.

The light guide pipe 18 is made of an acrylic material and is provided with prisms 19 as shown in FIG. 7 to transform the point light emitted from the diodes 16 into linear light L2.

The light guide pipe 18 has light distribution lenses 21, e.g. concave lenses, provided at both of its end portions facing the diodes 16, respectively. The center 22 of the concave lenses 21 is horizontally shifted from the light-emitting or illuminating center (i.e., the optical axis) "c" of the diodes 16 by a distance "d" of 0.3 mm, for example, to the side of the light guide plate 23, i.e., the side opposite to that of the prisms 19. Since the optical axis of the light from the light-emitting diodes 16 is shifted from the center 22 of the concave lenses 21, the point light can be sufficiently distributed.

The concave lenses 21 are approximately similar in shape to light-emitting (illuminating) portions of the diodes 16. Each of the lenses 21 is concave in shape, for example, a half spheroid. As shown in FIG. 1, it has the length (longer diameter along the major axis) "a" of 2.5 mm, the breadth (shorter diameter along the minor axis) "b" of 1.0 mm in cross section, respectively, and the depth "e" of 2.5 mm from the center 22 to the top. The length, breadth and depth "a", "b" and "e" of the concave lens are preferably larger than those of the illuminating portions of the light-emitting diodes 16.

The side reversed to that of the prisms 19 of the light guide pipe 18 faces the incident side of the rectangular light guide plate 23, which further transforms the linear light L2 transformed by the prisms 19 into the surface light L3.

Figure 6:
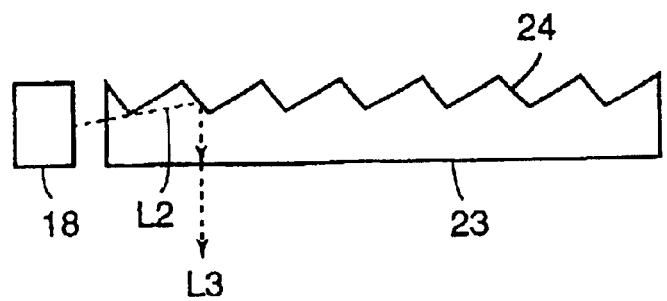
FIG. 6 is a schematic plan view of an optical path from the light guide pipe to the light guide plate in the surface light source shown in FIG. 1.

The light guide plate 23 has special prisms 24 on its upper surface as shown in FIG. 6. The prisms 24 are saw-toothed in cross section and gradually varied in size depending on distance from the light guide pipe 18. The light guide plate 23 has a lower surface on which an anti-reflection material is vapor-deposited. The light guide plate 23 is formed by a molded member made of an optically transparent resin material such as polycarbonate, acryl or cyclo-olefin polymer ("ZEONOR", registered trademark owned by Nippon Zeon Co., Ltd.).

Figure 2:
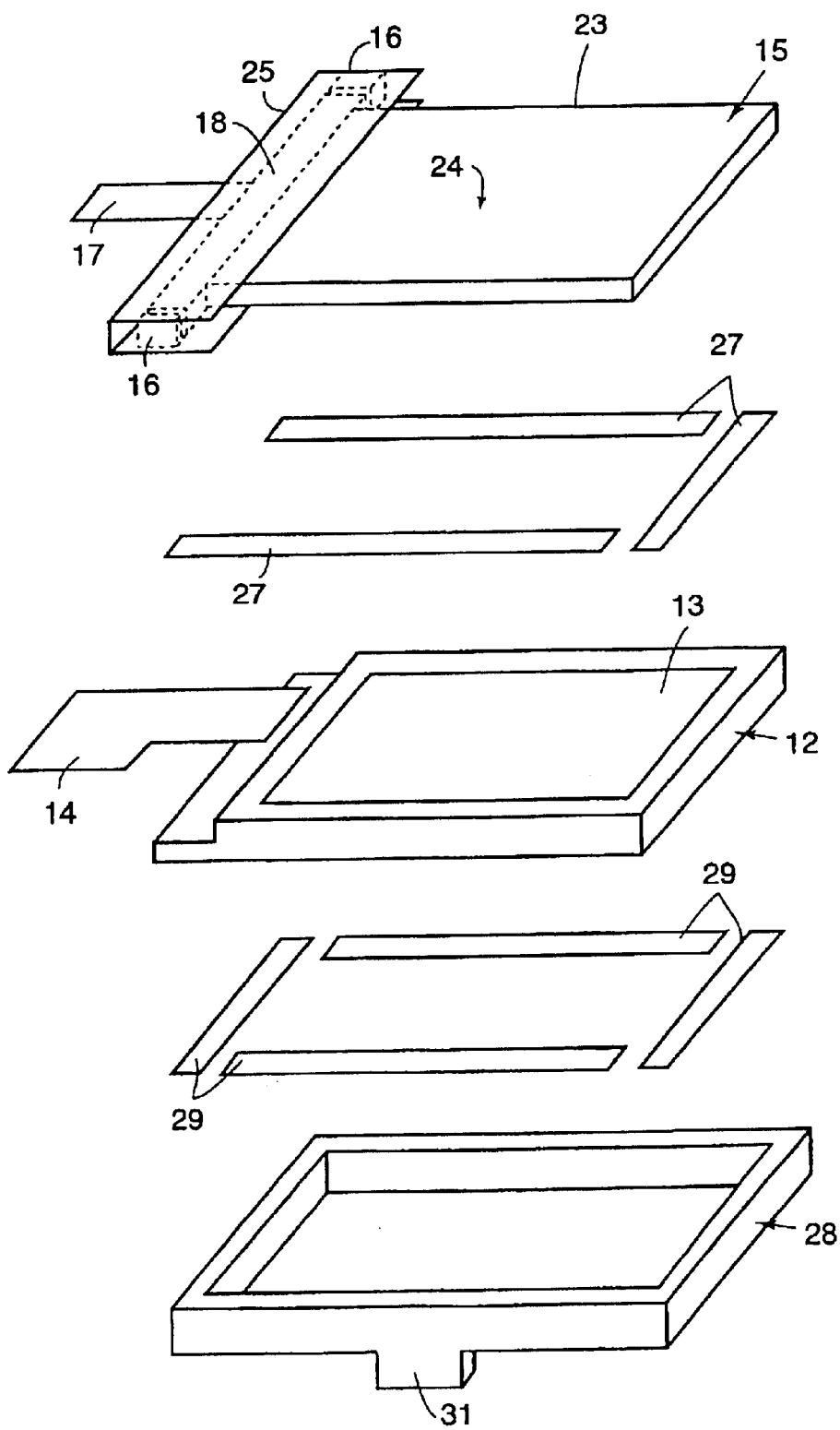
FIG. 2 is a perspective view of unfolded components of a liquid crystal display device with the surface light source shown in FIG. 1.
Figure 4:
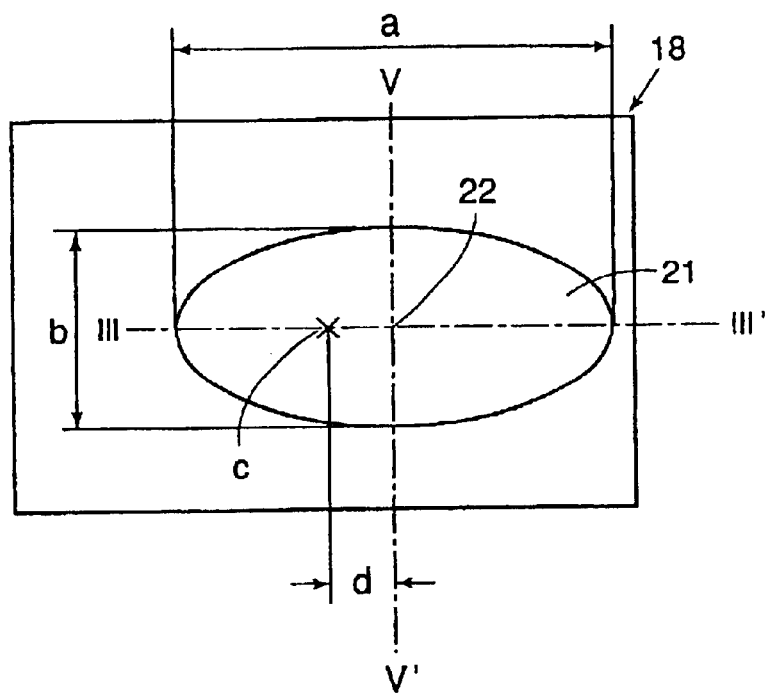
FIG. 4 is a side view of the light guide pipe shown in FIG. 1.
Figure 5:
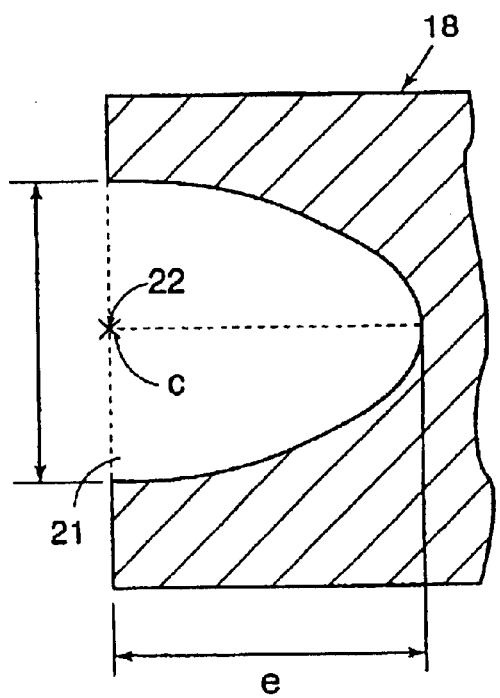
FIG. 5 is a sectional view of the concave lens of the light guide pipe cut along a line V-V' shown in FIG. 4.

The longitudinal side surfaces of the light guide pipe 18 that are not provided with the prisms 19 are covered by the high efficiency metal reflector 25 as shown in FIG. 2. The light from the diodes 16 is reflected and distributed to other sides than the side of the light guide plate 23. Such distributed light is reflected back by the reflector 25 to the inside of the light guide pipe 18.

Meanwhile, the peripheral portion of the polarizer 13 of the liquid crystal display panel 12 and the light guide plate 23 of the surface light source 15 are fixed on the surface of the liquid crystal display panel 12 three pressure-sensitive adhesive double-coated tapes 27.

The liquid crystal display panel 12 integrated with the surface light source 15 is received in a cell case 28 and is fixed thereto by four pressure-sensitive adhesive double-coated tapes 29. These components are incorporated into a module. The cell case 28 has a projection 31 on its lower portion to be fixed to a mobile phone or a compact information terminal.

Next, functions of the embodiment will be explained below.

The flexible printed circuit board 17 supplies electrical energy to the light-emitting diodes 16. The diodes 16 emit point light L1 to both edges of the light guide pipe 18.

The concave lenses 21 refract incident light onto the light guide pipe 18 so that such refracted light reaches not only entrance portions of the pipe 18 but also deeper inside portions thereof. Since the light L1 incident on the light guide pipe 18 is changed in direction by the concave lenses 21, some components of the light traveling along the X axis refract along the direction of the −Y axis, i.e., the one opposite to the direction of the light guide plate 23 (see the coordinate axes X, Y and Z shown in FIG. 7).

The incident light L1 traveling through the light guide pipe 18 is transformed into linear light L2 by the prisms 19. As shown in FIG. 6, the linear light L2 is inputted to the light guide plate 23 where the linear light L2 is further transformed into surface light L3 by the prisms 24. The surface light L3 is projected onto the surface of the liquid crystal display panel 12.

The surface light L3 incident on the liquid crystal display panel 12 is reflected by a reflector not shown but provided inside the display panel 12. Since the reflected light passing through the light guide plate 23 illuminates pictures at the pixels of the display panel 12, the pictures are visible to an observer.

As set forth above, according to the present invention, in order to increase the quantity of linear light L2 incident on the light guide plate 23 from the light guide pipe 18, it is necessary for the transforming efficiency of light L2 incident on the light guide pipe 18 from the light emitting diodes 16 to be as high as possible.

Measurement data of an embodiment in accordance with the present invention will be compared below with those of a prior art surface light source.

Since the point light L1 radiates from the diodes 16 towards the light guide pipe 18 in a cone-shaped projection of light, the definitions of the coordinate axes X, Y and Z are needed to be defined to analyze the light, as shown in FIG. 7. The center or origin of the coordinate axes is one of the light-emitting diodes 16. The X direction is defined as the direction extending from the light-emitting diodes 16 towards the light guide pipe 18. The Y direction is defined as the direction extending from the light guide pipe 18 towards the light guide plate 23. The Z direction is defined as the direction extending from the light guide plate 23 to the liquid crystal display panel 12.

The components of light traveling in ±Z directions from the diodes 16 totally reflect on the reflector 25 and return to the light guide pipe 18. Only a Y direction component of the reflecting and returning light is incident on the light guide plate 23 by way of the prisms 19 of the light guide pipe 18.

Light directly propagating in the +Y direction from the diodes 16 is separated into two components refracted and reflected by a refractive surface located between the light guide pipe 18 and the light guide plate 23, respectively. The refracted light is directly incident on the light guide plate 23 but the reflected light is incident on the light guide plate 23 by way of the prisms 19 of the light guide pipe 18.

±X direction components of the light directly propagating from the diodes 16 to the inside of the light guide plate 23 are largest in energy. The ±X direction components are not effectively utilized but are lost because they disperse from the edges of the light guide pipe 18.

The concave lenses 21 opposite to the diodes 16 are provided at both edges of the light guide pipe 18 as set forth above in detail. The lenses 21 re-direct the ±X direction light components into a Y-direction light component. Since, with this structure, the ±X-direction light components lost in the prior art light source are effectively utilized by the present invention, the supply efficiency of light from the prism 19 of the light guide pipe 18 becomes higher and the quantity of light projected from the surface of the light guide plate 23 also increases significantly. As a result, it improves the brightness of the light guide plate and the display area of the liquid crystal display panel.

Figure 13:
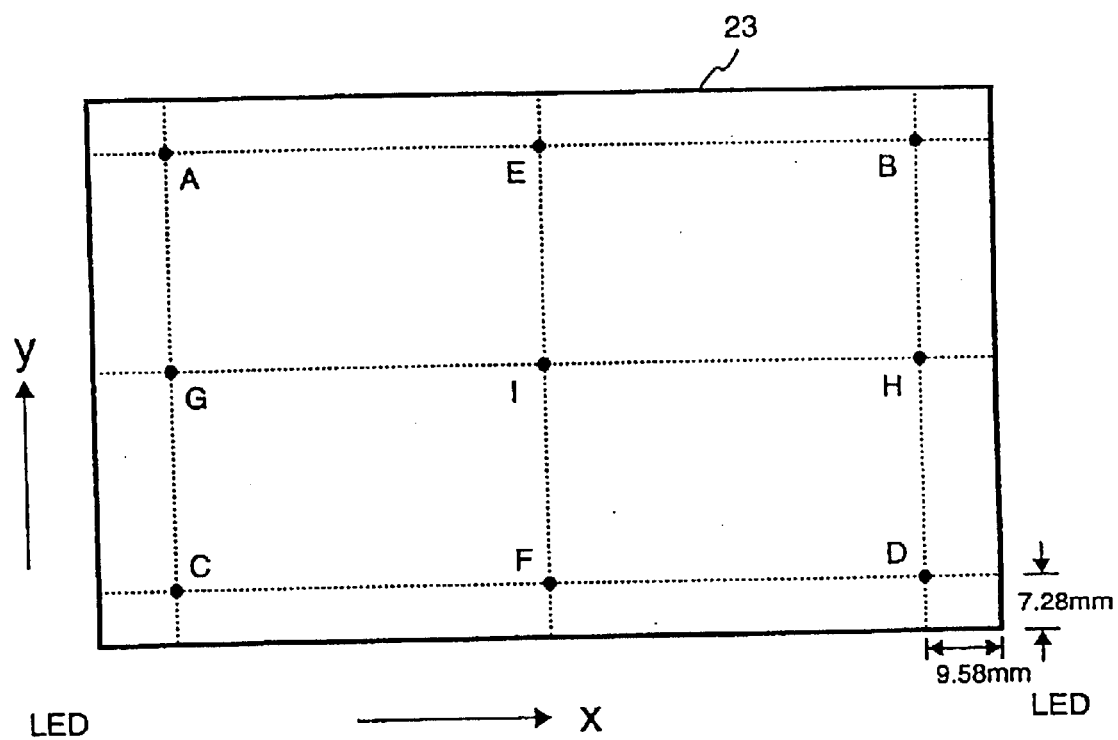
FIG. 13 shows brightness measurement points on a light guide plate of a liquid crystal display device.

The brightness data described in Table 1 have been obtained from nine measurement points of the surface light source 15 of the invention under the following conditions: the diodes 16 have been supplied with electric current of 18 mA and the liquid crystal display panel 12 has been driven to display an entirely white picture. As shown in FIG. 13, four measurement points A, B, C and D are located at 9.58 mm in an X-axis direction and 7.28 mm in Y-axis direction from the vertices of the light guide plate 23 corresponding to the effective display area of the liquid crystal display device. Measurement points E, F, G and H are also located at the mid points of lines defined by points A and B, C and D, A and C, and B and D, respectively. The measurement point I is further located at the intersection of lines defined between points E and F and points G and H.

TABLE 1

| | | | |
|---|---|---|---|
| | A: 30.0 cd/m² | E: 33.0 cd/m² | B: 29.0 cd/m² |
| | G: 33.0 cd/m² | I: 35.0 cd/m² | H: 31.0 cd/m² |
| | C: 39.0 cd/m² | F: 40.0 cd/m² | D: 38.0 cd/m² |
| LED | | | LED |

For comparison purposes, the brightness of a prior art surface light source has been measured at the same points under the same conditions as set forth above. The data obtained from the measurement are described in Table 2.

TABLE 2

| | | | |
|---|---|---|---|
| | A: 12.0 cd/m² | E: 14.0 cd/m² | B: 12.0 cd/m² |
| | G: 23.0 cd/m² | I: 27.0 cd/m² | H: 21.0 cd/m² |
| | C: 36.0 cd/m² | F: 38.0 cd/m² | D: 32.0 cd/m² |
| LED | | | LED |

The brightness of each measurement point in the surface light source 15 of the embodiment has been not only successfully better than that of the prior art surface light source 1 but also the former has been more uniform than the latter.

Although the liquid crystal display panel 12 in the embodiment explained above is illuminated by the front light source 15, the present invention is also applicable to a rear light source, other surface light sources, etc. used for a liquid crystal display device in the case that the point light L1 from the light-emitting diodes 16 is transformed into the surface light L3.

Although the length and breadth "a" and "b" of the concave lenses 21 provided at both edges of the light guide pipe 18 of the front light source 15 are approximately equal to those of the illuminating portions of the light-emitting diodes 16 in the embodiment, the same operation and effect as set forth in the embodiment can be obtained from half-spherical lenses in place of the lenses 21 in which the breadth "b" may be even larger than that of the illuminating (light emitting) portion of the diodes 16.

The number of the light-emitting diodes 16 may be two or more at each edge of the light guide pipe 18 instead of one in the present embodiment. A plurality of the light guide pipes may also be provided.

Figure 8:
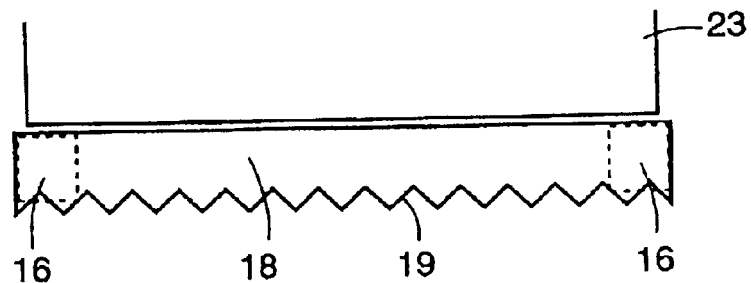
FIG. 8 is a schematic arrangement of a light guide pipe and a light guide plate in a second embodiment of the present invention.
Figure 9:
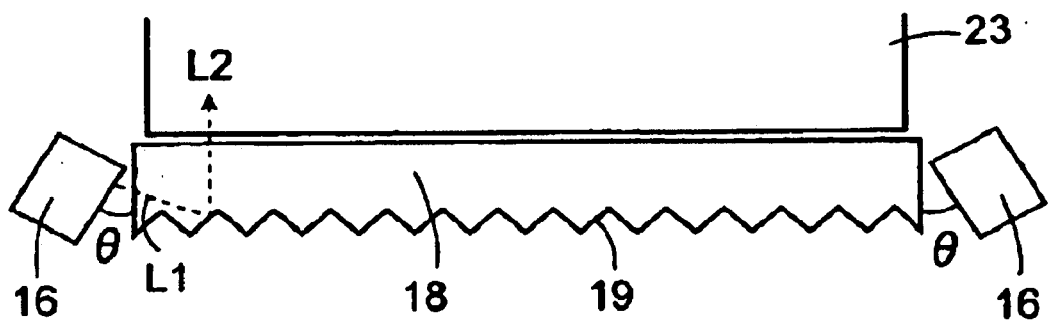
FIG. 9 is a schematic arrangement of a light guide pipe and a light guide plate in a third embodiment of the present invention.
Figure 10:
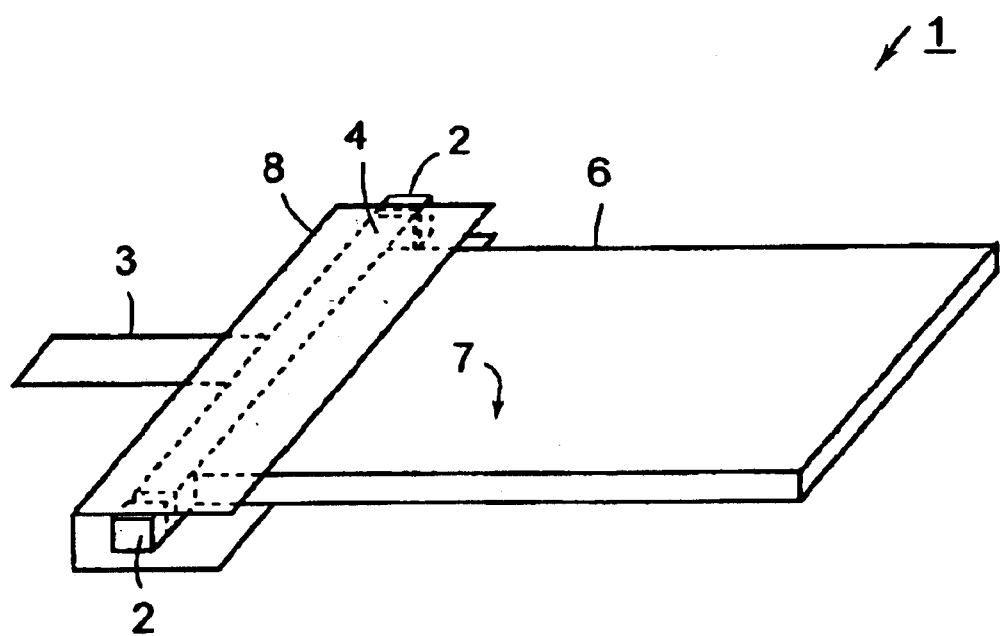
FIG. 10 is a perspective view of a prior art surface light source.
Figure 11:
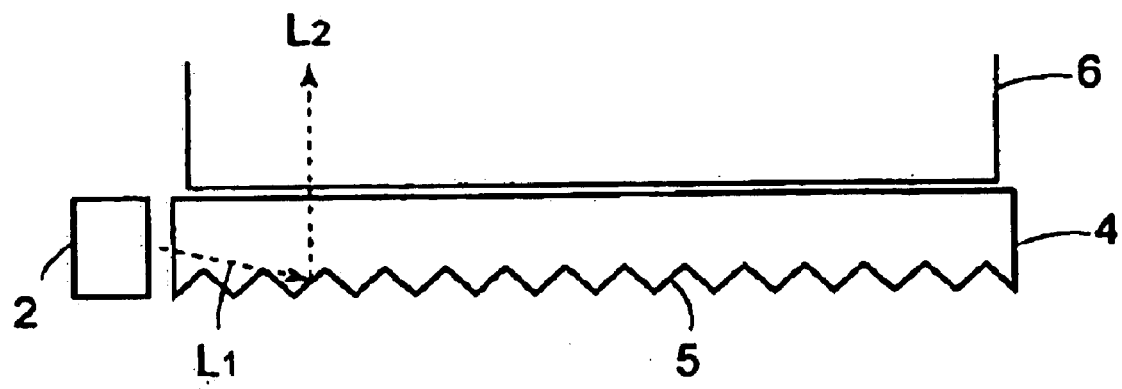
FIG. 11 is a schematic plan view of an optical path from a light guide pipe to a light guide plate in the surface light source shown in FIG. 10.
Figure 12:
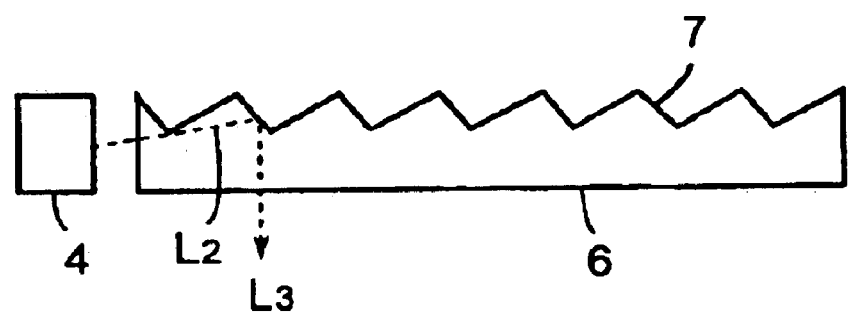
FIG. 12 is a schematic plan view of the optical path from the light guide pipe to the light guide plate in the surface light source shown in FIG. 10.

The light-emitting diodes 16 may be built in the light guide pipe 18 as shown in FIG. 8 to save more space to receive the diodes 16 than the prior art surface light source. The optical axis of the diodes 16 may be declined at an angle θ as shown in FIG. 9 to separate them from the edge surface of the light guide pipe. The angle θ may range from 2° to 30°, i.e., 2°≦θ≦30°, with respect to the longitudinal axis of the light guide pipe 18. Since the light from the diodes 16 is directly incident on the prisms 19 in this case, the brightness is more than that of the prior art surface light source.

According to the present invention, since point light from a light source is refracted or aligned by a concave lens of a linear light transforming member, the point light is efficiently transformed into surface light by a surface light transforming member so that the brightness of such transformed surface light is significantly improved.

What I claim is:

1. A surface light source comprising:

a point light source to illuminate point light;

a first light transforming member to transform said point light into linear light; and a second light transforming member to transform said linear light into a surface light;

wherein said first light transforming member includes a lens provided opposite to said point light source to distribute said point light to said first light transforming member, said second light transforming member is plate-like in shape, and said lens is made of a concave portion with a half ellipsoid in cross section.

2. The surface light source according to claim 1, wherein said concave portion has a center which is shifted from that of said point light source to the side of said second light transforming member.

3. The surface light source according to claim 1, wherein said point light source includes a light-emitting portion which is elliptic in cross section, and a cross sectional length and breadth at one edge of said half ellipsoid are larger than those of said light-emitting portion.

4. The surface light source according to claim 1, wherein said point light source is built in said first light transforming member.

5. The surface light source according to claim 1, wherein an optical axis of said point light source rotates at an angle θ ranging from 2° to 30°, i.e., 2°≦θ≦30°, with respect to a longitudinal axis of said first light transforming member.

* * * * *